US 6,726,549 B2

(12) United States Patent
Rivir et al.

(10) Patent No.: US 6,726,549 B2
(45) Date of Patent: *Apr. 27, 2004

(54) PARTICLE BLAST APPARATUS

(75) Inventors: Michael E. Rivir, Loveland, OH (US); Kevin R. Dressman, Loveland, OH (US)

(73) Assignee: Cold Jet, Inc., Loveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/142,270

(22) Filed: May 9, 2002

(65) Prior Publication Data

US 2003/0017792 A1 Jan. 23, 2003

Related U.S. Application Data

(63) Continuation-in-part of application No. 10/123,974, filed on Apr. 17, 2002, and a continuation-in-part of application No. 09/658,359, filed on Sep. 8, 2000, now Pat. No. 6,524,172.

(51) Int. Cl.⁷ ................................................ B24C 9/00
(52) U.S. Cl. ............................................ 451/99; 451/75
(58) Field of Search .............................. 451/75, 94, 99

(56) References Cited

U.S. PATENT DOCUMENTS

| | | | |
|---|---|---|---|
| 2,235,324 A | 3/1941 | Moreland ...................... 18/55 |
| 2,246,497 A | 6/1941 | Beck ........................... 221/120 |
| 2,254,448 A | 9/1941 | Pursel ........................... 259/39 |
| 2,640,629 A | 6/1953 | Thomson et al. ........... 222/161 |
| 3,101,853 A | 8/1963 | Long et al. |
| 3,130,879 A | 4/1964 | Messing |
| 3,151,784 A | 10/1964 | Tailor |
| 3,219,393 A | 11/1965 | Starrett |
| 3,245,590 A | 4/1966 | Hawkins |
| 3,257,040 A | 6/1966 | Dumbaugh et al. ......... 222/161 |
| 3,324,605 A | 6/1967 | Lester |
| 3,407,972 A | 10/1968 | Cymbalisty ................. 222/193 |
| 3,556,355 A | 1/1971 | Ruiz |
| 3,633,797 A | 1/1972 | Graff |
| 4,031,032 A | 6/1977 | Jablecki ....................... 210/474 |
| 4,058,986 A | 11/1977 | Granholm |
| 4,067,150 A | 1/1978 | Merrigan ..................... 51/436 |
| 4,094,448 A | 6/1978 | Häseler et al. .............. 222/342 |
| 4,180,188 A | 12/1979 | Aonuma et al. |
| 4,372,338 A | 2/1983 | Efferson |
| 4,389,820 A | 6/1983 | Fong et al. |
| 4,536,121 A | 8/1985 | Stewart et al. |
| 4,617,064 A | 10/1986 | Moore |
| 4,707,951 A | 11/1987 | Gibot et al. .................. 51/410 |
| 4,744,181 A | 5/1988 | Moore et al. ................. 51/436 |
| 4,843,770 A | 7/1989 | Crane et al. .................. 51/439 |
| 4,947,592 A | 8/1990 | Lloyd et al. .................. 51/436 |

(List continued on next page.)

FOREIGN PATENT DOCUMENTS

| | | |
|---|---|---|
| DE | 609842 | 1/1935 |
| EP | 0786311 | 7/1997 |
| FR | 547153 | 12/1922 |

OTHER PUBLICATIONS

Oct. 31, 2001 Office Action from USSN 09/658,359, now USP 6,524,172.

Claims as originally filed in USSN 09/658,359.

Primary Examiner—Joseph J. Hail, III
Assistant Examiner—David B. Thomas
(74) Attorney, Agent, or Firm—Frost Brown Todd LLC

(57) ABSTRACT

A particle blast apparatus includes a hopper assembly, which is mechanically isolated from the rest of the particle blast system. Energy is imparted to the hopper by an impulse assembly, which preferably is mounted directly to the hopper. The hopper is mounted to the apparatus on a slide assembly, which allows the hopper to be moved to a second position at which particles may be discharged from the hopper exit away from the particle feeder.

9 Claims, 16 Drawing Sheets

U.S. PATENT DOCUMENTS

| | | | |
|---|---|---|---|
| 5,018,667 A | 5/1991 | Lloyd | 239/132.5 |
| 5,050,805 A | 9/1991 | Lloyd et al. | 239/424 |
| 5,109,636 A | 5/1992 | Lloyd et al. | 51/320 |
| 5,188,151 A | 2/1993 | Young et al. | 137/874 |
| 5,245,798 A | 9/1993 | Carpenter | 51/423 |
| 5,301,509 A | 4/1994 | Lloyd et al. | 62/35 |
| 5,405,049 A * | 4/1995 | Ricciardi | 222/1 |
| 5,473,903 A | 12/1995 | Lloyd et al. | 62/35 |
| 5,492,497 A | 2/1996 | Brooke et al. | 451/99 |
| 5,571,335 A | 11/1996 | Lloyd | 134/1 |
| 5,618,177 A | 4/1997 | Abbott | 51/423 |
| 5,660,580 A | 8/1997 | Lehnig | 451/38 |
| 5,685,435 A | 11/1997 | Picioccio et al. | 209/677 |
| 5,716,113 A | 2/1998 | Plourde | 312/35 |
| 5,795,214 A | 8/1998 | Leon | 451/102 |
| 6,148,636 A | 11/2000 | Wade, Jr. | 62/604 |
| 6,188,936 B1 | 2/2001 | Maguire et al. | 700/265 |
| 6,524,172 B1 * | 2/2003 | Rivir et al. | 451/99 |

\* cited by examiner

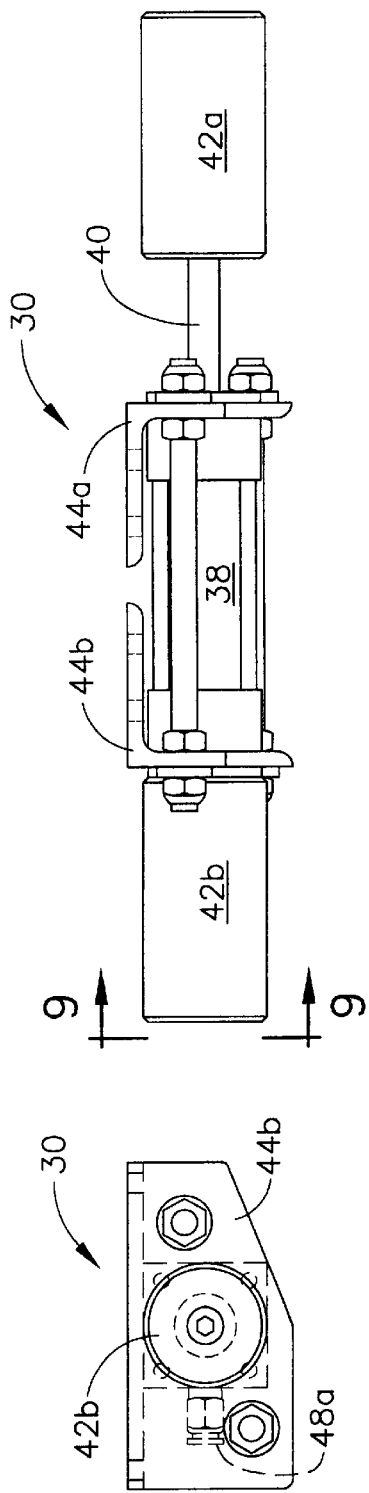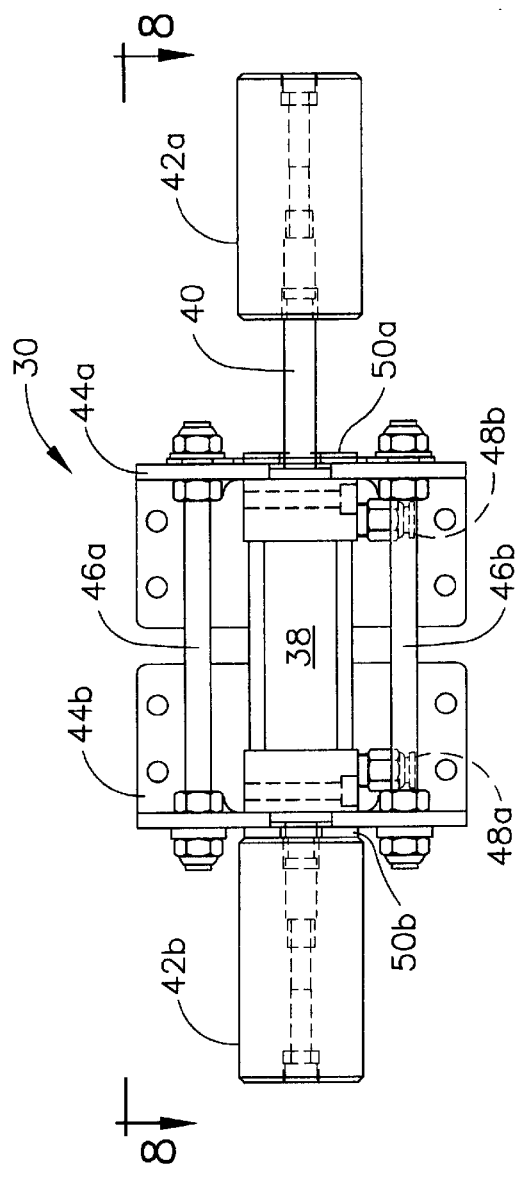
FIG. 8
FIG. 7
FIG. 9

PARTICLE BLAST APPARATUS

This is a continuation in part application of U.S. patent application Ser. No. 09/658,359 filed Sep. 8, 2000, now U.S. Pat. No. 6,524,172 issued on Feb. 25, 2003, titled Particle Blast Apparatus, the disclosure of which is incorporated herein by reference, and of U.S. patent application Ser. No. 10/123,974, filed Apr. 17, 2002, for Feeder Assembly For Particle Blast System, the disclosure of which is incorporated herein by reference, both of which are commonly owned by the assignee hereof.

TECHNICAL FIELD

The present invention relates generally to particle feeders, and is particularly directed to a device which provides improved transport of particles into a particle blast gas flow for ultimate delivery as entrained particles to a workpiece or other target. The invention will be specifically disclosed in connection with a hopper and transport mechanism in a cryogenic particle blast system which provides improved flow of particles to the exit of the hopper and prevents or reduces the agglomeration of particles exiting the hopper into, for example, a transport rotor, for delivery to the transport gas of the particle blast system.

BACKGROUND OF THE INVENTION

Particle blasting systems have been around for several decades. Typically, particles, also known as blast media, is fed into a transport gas flow and are transported as entrained particles to a blast nozzle, from which the particles exit, being directed toward a workpiece or other target. It is not unknown for the particles to clump or stick together, impeding the delivery of particles into the transport gas flow.

Such compaction and agglomeration of particles is particularly a problem when the blast media is cryogenic particles, such as in carbon dioxide blasting. Although still a relatively young industry, carbon dioxide blasting systems are well known in the industry, and along with various associated component parts, are shown in U.S. Pat. Nos. 4,744,181, 4,843,770, 4,947,592, 5,050,805, 5,018,667, 5,109,636, 5,188,151, 5,301,509, 5,571,335, 5,301,509, 5,473,903, 5,660,580 and 5,795,214, all of which are incorporated herein by reference. Although the present invention will be described herein in connection with a particle feeder for use with carbon dioxide blasting, it will be understood that the present invention is not limited in use or application to carbon dioxide blasting. The teachings of the present invention may be used in application in which there can be compaction or agglomeration of any type of particle blast media.

Generally, the blast media particles, such as carbon dioxide particles, are transported from a hopper, which holds the supply of particles, into a transport gas. The particles may be introduced into the transport gas by venturi or other vacuum effect, or by a feeder. Various feeder designs exist, functioning to transport the particles from the hopper exit into the transport gas, such as by the radial transport feeder shown in U.S. Pat. No. 4,947,592. Hoppers may receive particles from any source, such as a pelletizer that is part of the blast system, or a source separate from the blast system and loaded into the hopper.

Prior attempts in the art to promote the flow of particles, and in particular cryogenic particles, to and through the exit of a hopper or other storage/feeder structure include the use of vibrators or thumpers which act on the walls of the hopper and the use of vertically oriented rotating augers and stirrers in or adjacent the hopper exit to mechanically advance the particles. Typically hoppers have been fairly rigidly connected to the blast system frame, which is now recognized to be a significant impediment to transferring sufficient energy to the hopper walls to effect the flow of particles. In such designs, a significant portion of the energy transferred to the hopper was also transferred through the hopper to the blast system frame. The energy that went to the frame produced undesirable results, manifested as noise, vibration and movement of the entire system, fatigue and stress in the hopper and frame, as well as the consumption of extra energy.

The desired higher total energy was difficult to achieve with thumpers, in which reciprocating plungers/strikers repetitively strike the hopper, as the size of the movable mass was a limiting factor. Each impact of a large mass against a hopper could undesirably cause the entire system to jump. Thus, the required level of energy was achieved though high frequency/low mass vibrators. High frequency, however, tends to compact the particles, impeding the flow. Vertical hopper walls compounded the compaction problem present with high frequency energy, forcing hopper walls away from vertical walls to inclined walls. However, hoppers with inclined walls have less internal capacity than hoppers with vertical walls.

With cryogenic particles, even when they are moved toward the exit of the hopper, they may easily bridge the exit, or form agglomerated clumps too large to be ingested by the feeder mechanism, slowing or blocking particle flow.

Thus, there is a need in the art for particle blast system that has improved, reliable particle flow from the hopper to the hopper exit and on to the transport gas.

SUMMARY OF THE INVENTION

In accordance with the teachings of the present invention, the hopper assembly is isolated from the rest of the particle blast system on a hopper slide assembly. Energy is imparted to the hopper by an impulse assembly, which preferably is mounted to the hopper for example on a side wall, such as a reciprocating mass to produce discrete, low frequency energy impulses. The closer to the hopper exit that the energy is imparted to the hopper, the more effective the energy is at promoting the flow of particles. The isolation of the hopper allows most of the energy produced by the impulse assembly to be transferred directly to the cryogenic particles in the hopper, allowing the hopper to have vertical walls, maximizing the capacity of the hopper over the sloped side prior art hoppers. By mounting the hopper on a sliding frame, the hopper can be slid out of alignment with the feeder mechanism, allowing the hopper to be cleared of clogs or emptied of unused/unwanted particles, and more easily serviced or completely removed.

Having utility independent of the isolated hopper, another aspect of the present invention includes an operator controllable reciprocable member, which can be selectively extended into the particle flow from the hopper to the feeder, mechanically breaking up agglomerated particles.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 7 is a plan view of the impulse assembly of the hopper of FIG. 4, looking along arrow 6 of FIG. 5.

FIG. 8 is a side view of the impulse assembly of FIG. 7, looking along arrow 8 of FIG. 7.

FIG. 9 is a side view of the impulse assembly of FIG. 7, looking along arrow 9 of FIG. 8.

Reference will now be made in detail to the present preferred embodiment of the invention, an example of which is illustrated in the accompanying drawings.

DETAILED DESCRIPTION OF AN EMBODIMENT OF THE PRESENT INVENTION

Figure 1:
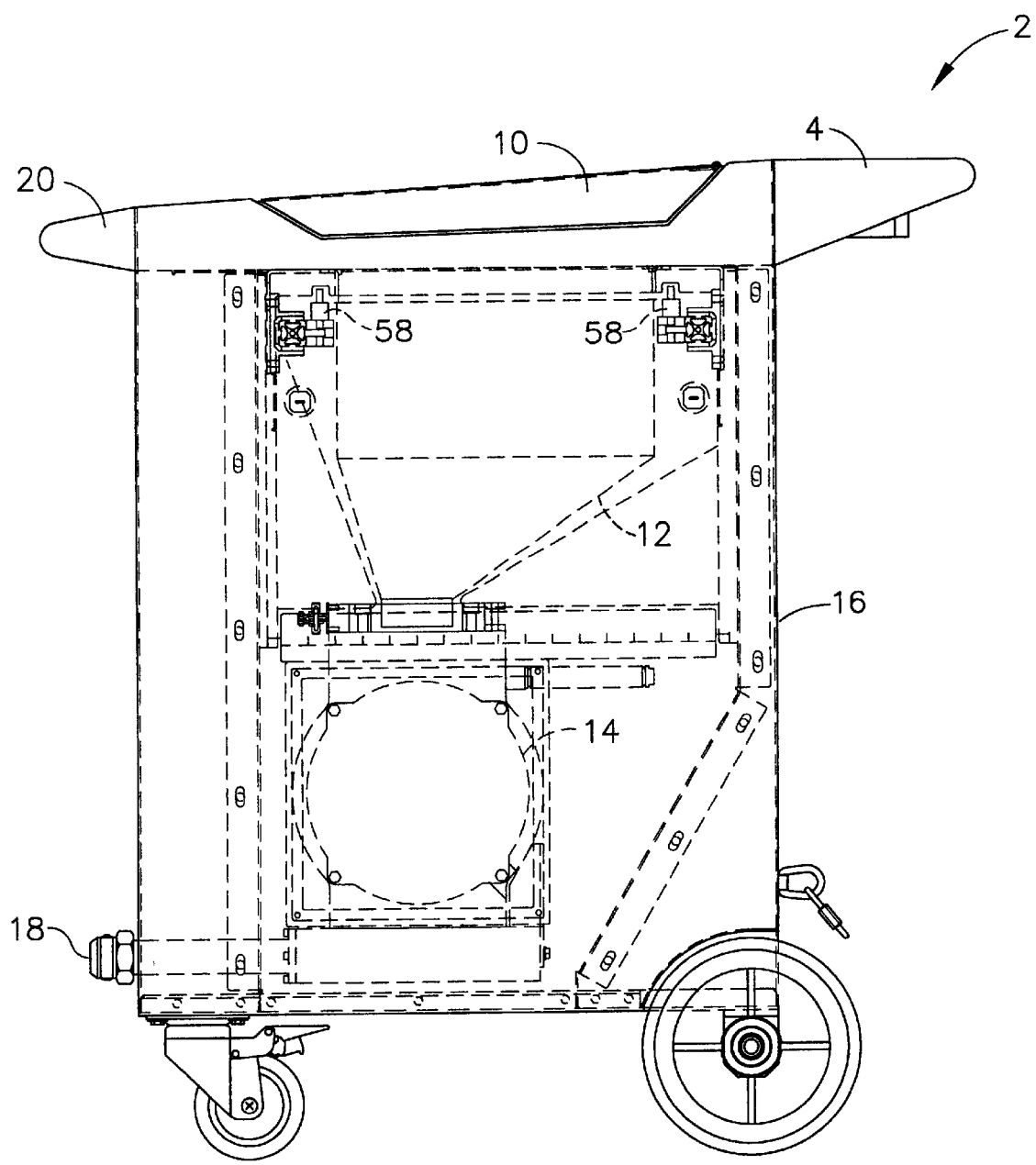
FIG. 1 is a side view of a particle blast system constructed in accordance with the teachings of the present invention, with the hopper assembly, hopper slide assembly, and feeder mechanism shown in hidden lines.
Figure 2:
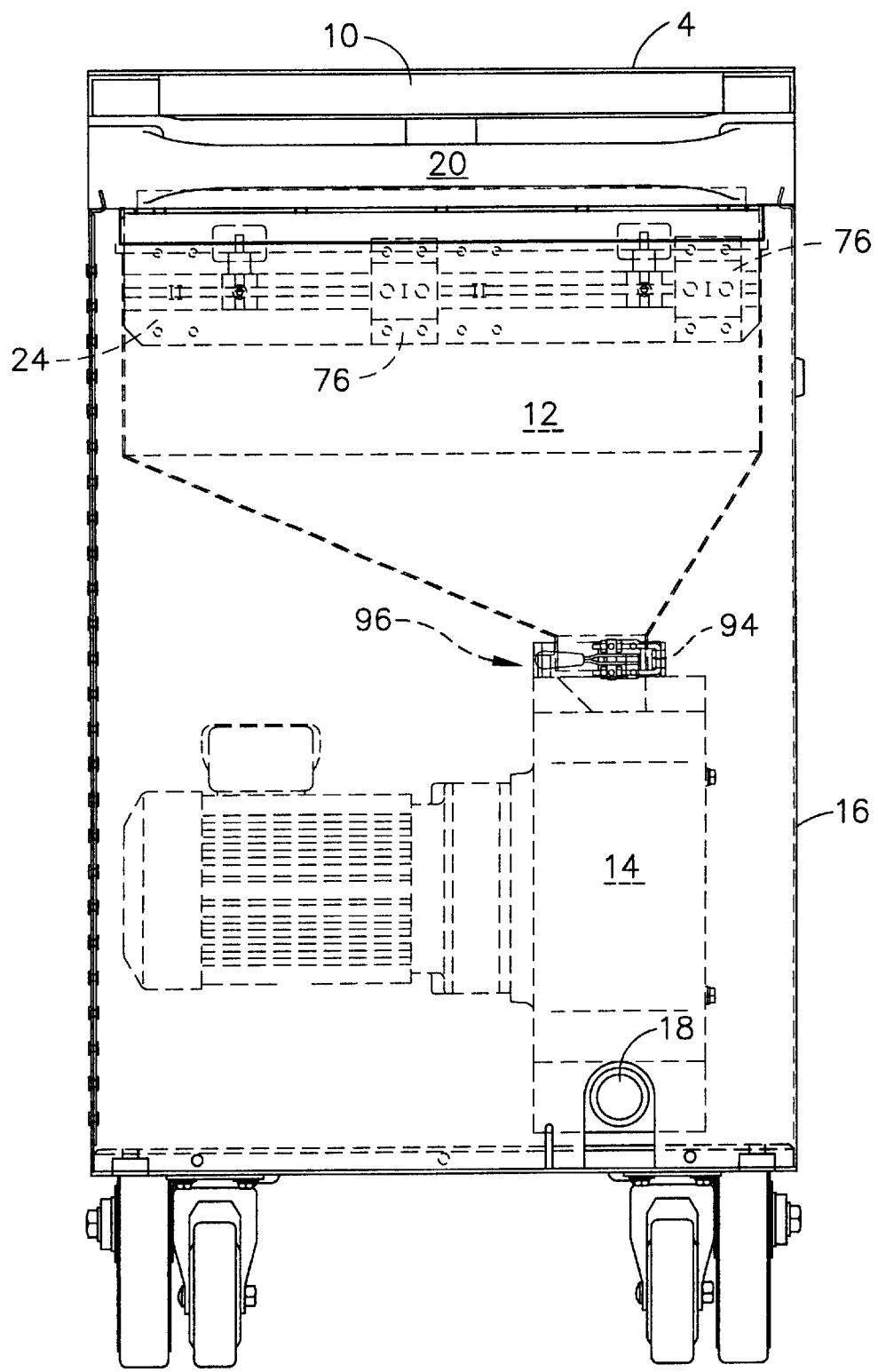
FIG. 2 is a front view of the particle blast system of FIG. 1.

Referring now to the drawings in detail, wherein like numerals indicate the same elements throughout the views, FIGS. 1 and 2 show particle blast apparatus generally at 2 with the blast hose and nozzle not shown. Particle blast apparatus 2 includes to 4 with pivotable cover 10 which covers the particle charging area, through which particles, carbon dioxide in the depicted embodiment, are loaded into particle blast apparatus 2. Particle blast apparatus 2 includes hopper assembly 12 and feeder assembly 14 enclosed by housing 16 of particle blast apparatus 2. Particle blast system 2 includes a frame (not identified separately) that provides the primary structural support for the components that comprise blast system 2. Hose connector 18 is located at housing 16 for connecting the blast hose (not shown). Handle 20 extends from housing 16.

Figure 3:
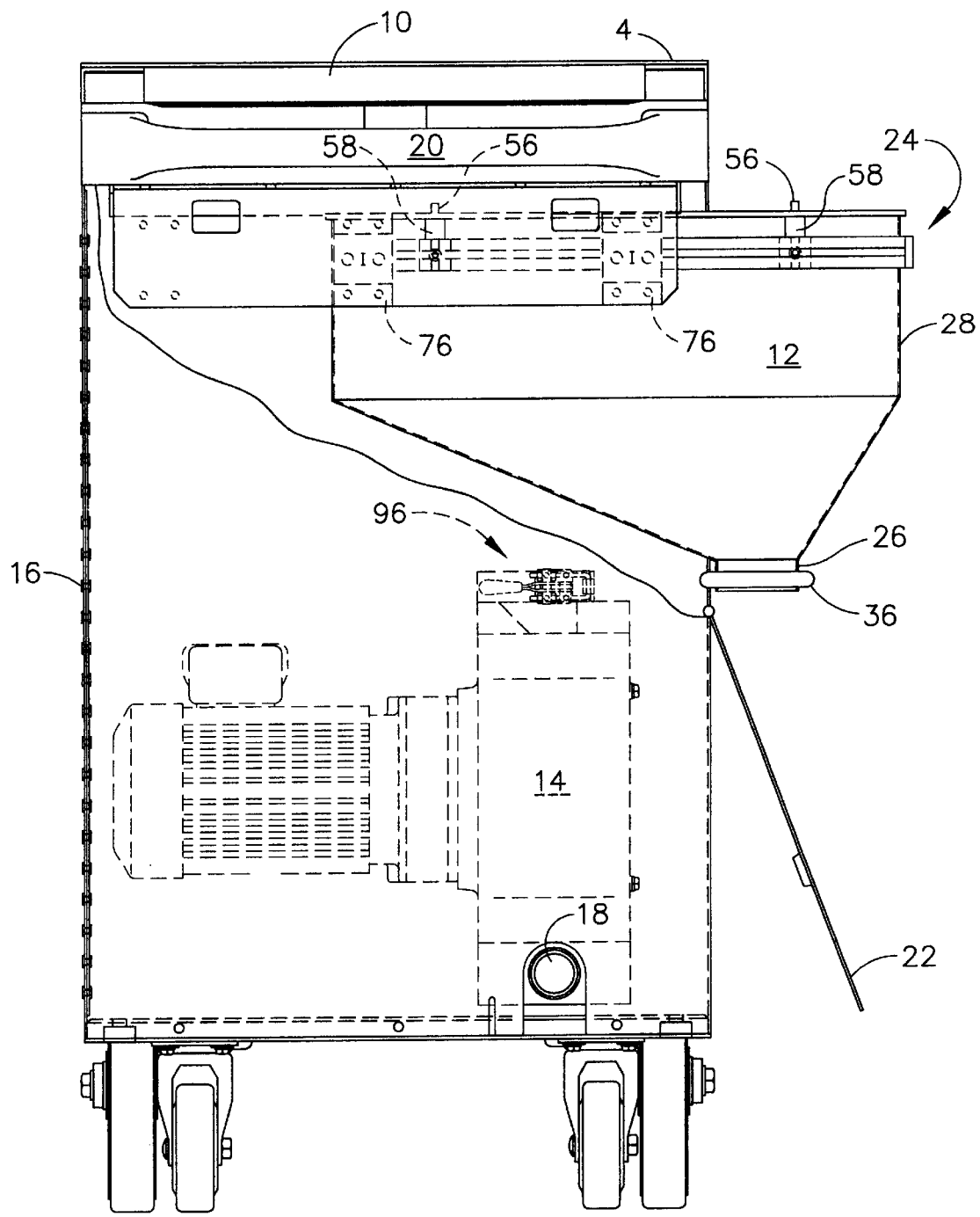
FIG. 3 is a front view of the particle blast system of FIG. 1 with the access panel opened and the hopper extended.

Referring also to FIG. 3, access door 22 is shown open, with hopper assembly 12 shown in an extended position, partially disposed within housing 16. Hopper assembly 12 is carried by housing 16 by hopper slide assembly 24 (described below) which functions similar to a drawer slide, allowing hopper assembly 12 to be movable between a first position at which hopper exit 26 is located aligned with feeder assembly 14 so as to direct particles into feeder assembly 14, as shown in FIG. 2, and a second position at which hopper exit 26 is not aligned with feeder assembly 14 so as not to direct particles into feeder assembly 14. As seen in FIG. 3, in the embodiment depicted, hopper exit 26 is shown located outside of the interior of housing 16, whereat particles in hopper 28 may be discharged not into feeder assembly 14, such as to clear clogs in hopper 28 or to dispose of unused or unwanted particles without directing them through the blast hose (not shown).

Figure 4:
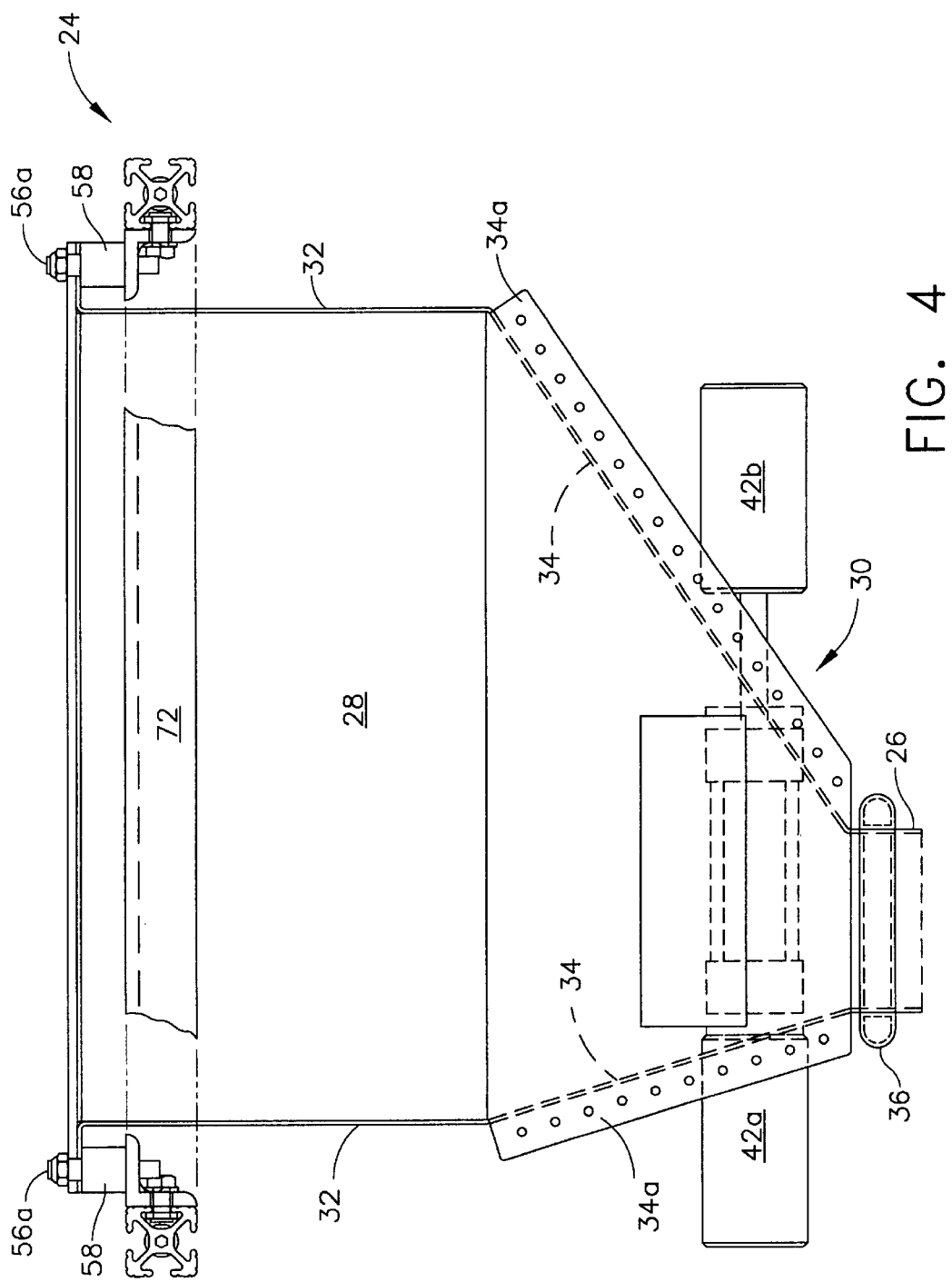
FIG. 4 is a front view of the hopper of FIG. 1, showing the impulse assembly which imparts energy to the hopper.
Figure 6:
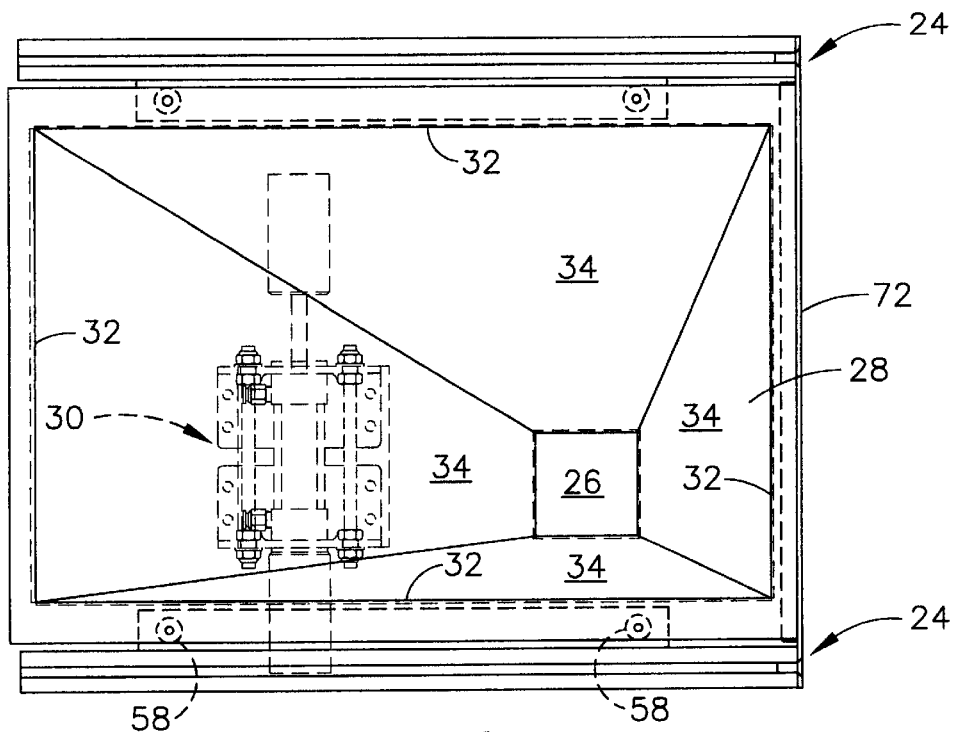
FIG. 6 is a top view of the hopper of FIG. 4.
Figure 5:
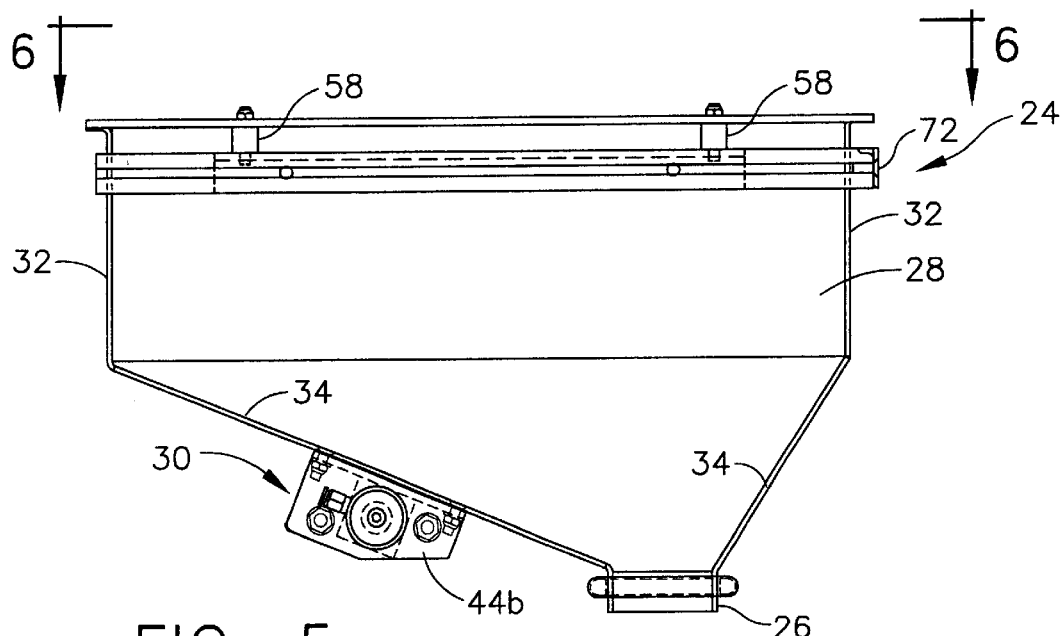
FIG. 5 is a side view of the hopper of FIG. 4.

Referring now to FIGS. 4, 5 and 6, hopper assembly 12 includes hopper 28 with hopper exit 26, hopper slide assembly 24, and impulse assembly 30. As can be seen, hopper 28 has a generally rectangular shape when viewed from the top, although it is to be understood that any suitable shape may be used. Hopper includes vertical sidewall sections 32 which lead into inclined bottom wall sections 34, terminating at hopper exit 26. Seal 36 is disposed about hopper exit 26 as shown, sealing between hopper exit 26 and feeder assembly 14, as described below. The angles of inclined bottom wall sections 34 are selected to promote particle flow. As shown in FIG. 4, inclined bottom wall sections 34 are joined to each other along their edges by overlapping seam seams 34a, although any construction for joining the walls may be used, such as forming the seam right at the intersections of adjacent bottom wall sections or adjacent sidewall sections. The interior surfaces of at least the inclined bottom wall sections 34 may be coated with a non-stick or low friction surface, such as Teflon, to promote movement of the particles. Bondable sheets of Teflon may be adhered to the inner surfaces.

Figure 4A:
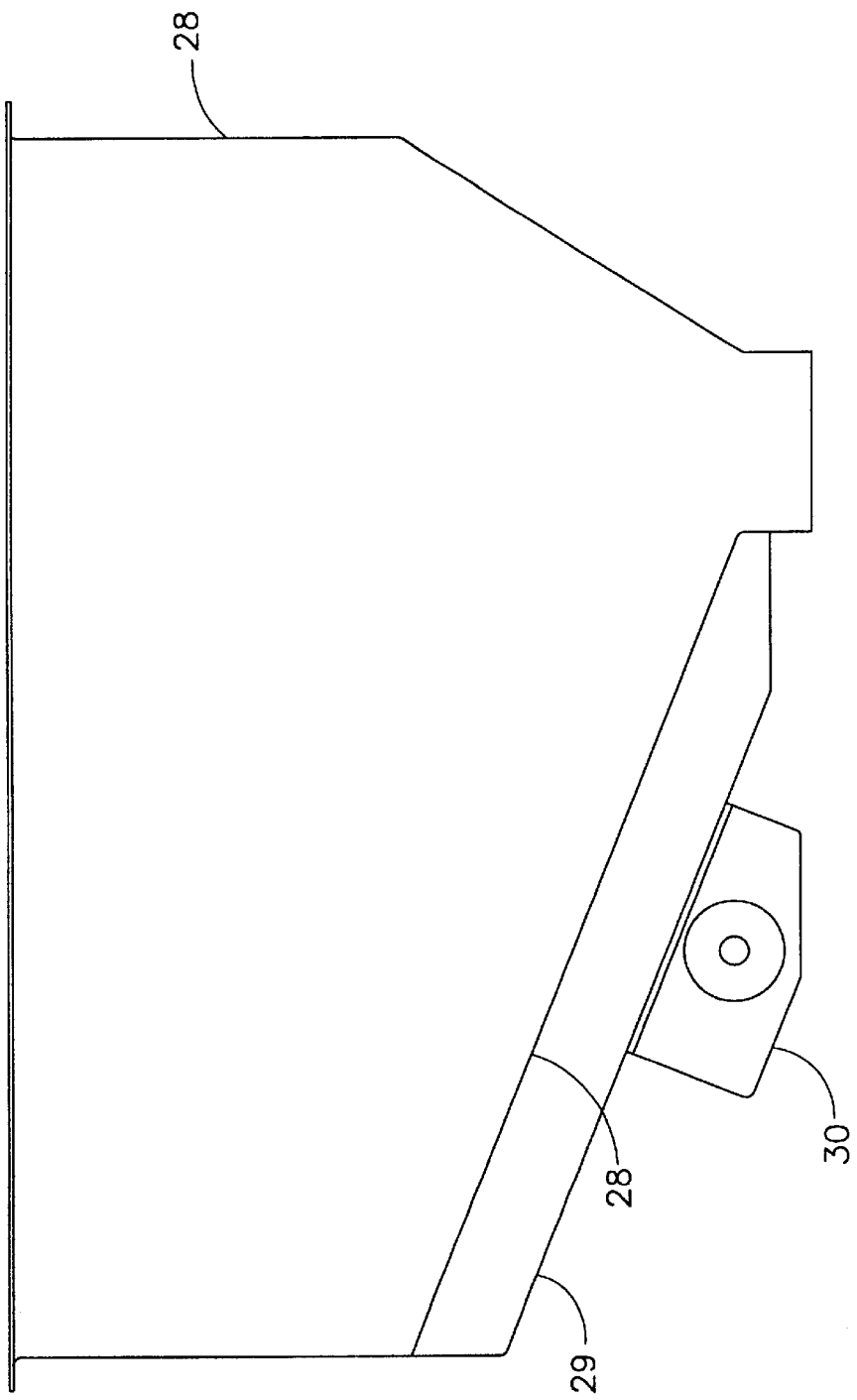
FIG. 4A is a side view of an alternate embodiment of the hopper of FIG. 4.

Mounted on inclined bottom wall section 34 as shown is impulse assembly 30 which imparts energy to hopper 28. In an alternate embodiment, illustrated in FIG. 4A, impulse assembly 30 may be mounted to a bracket 29 carried by hopper 28. This configuration spaces impulse assembly 30 from hopper 28 and its cold temperature which can have a deleterious effect on pneumatic operation of impulse assembly 30.

Referring also to FIGS. 7, 8 and 9, impulse assembly 30 includes actuator 38 with reciprocating rod 40 extending from either end of actuator 38. Masses, or weights, 42a and 42b are respectively carried by the respective distal end of rod 40. Masses 42a and 42b may be secured to rod 40 in any suitable manner, such as by fasteners inserted through bores in masses 42a and 42b which engage threaded holes formed in the respective ends of rod 40 (as shown but not numbered).

Actuator 38 is carried by brackets 44a and 44b, attached in any suitable manner to inclined bottom wall 34, and also held together by fasteners 46a and 46b. In the depicted embodiments, actuator 38 is double acting pneumatic cylinder having ports 48a and 48b. By alternately applying pressurized gas to ports 48a and 48b, rod 40 is reciprocated, causing masses 42a and 42b to be accelerated and decelerated, imparting energy to hopper 28. In the depicted embodiment, masses 42a and 42b were 2.5 pounds and were reciprocated at 1 Hz. A pressure regulator was used to deliver a constant pressure of 60 psig to actuator 38 over a supply pressure range of 60 psig to 140 psig and up to 300 psig, so that a constant energy output of impulse assembly 30 across the supply pressure range. To avoid metal to metal contact, washers 50*a* and 50*b* are disposed about rod 40 between masses 42*a* and 42*b* and brackets 44*a* and 44*b*. In the depicted embodiment, washers 50*a* and 50*b* were made of fiber reinforced rubber, although any material sufficient to withstand the impact of masses 42*a* and 42*b* without absorbing much energy may be used.

Brackets 44*a* and 44*b* sandwich actuator 38, as held together by fasteners 46*a* and 46*b*, providing the necessary structural integrity and strength. Additionally, this construction allows the use a smaller, lighter weight actuator. The lower the mass of hopper 28, including impulse assembly 30, the more energy (and more efficiently) transferred to the particles within hopper 28. Alternatively, particularly with bracket 29 shown in FIG. 4A, brackets 44*a* and 44*b* may be integrally formed with bracket 29.

Impulse assembly 30 is preferably carried directly by hopper 28, which includes being carried by bracket 29 attached directly to hopper 28, for efficient transfer of energy. However, impulse assembly 30 could alternatively not be mounted to hopper 28, such as, for example, being mounted to the frame. While this is not believed to be as preferable as being mounted to hopper 28, adequate energy can still be delivered. By delivering the energy to hopper 28 as close as possible to hopper exit 26, the energy is maximized at the most critical area for promoting particle flow. As shown, the energy is delivered as impulses at a low frequency rate of 1 Hz, which provides time for vibrations to dampen before each impulse, and in a general horizontal direction. Although energy pulses at 1 Hz delivered generally horizontally is believed to be particularly advantageous, it is within the teachings of the present invention, to deliver energy in any manner when the hopper is isolated so that energy delivered to the hopper is not transferred substantially therefrom to the frame structure or other components of the blast system.

Alternatively, impulse assembly 30 could be actuated upon command by the operator. Impulse assembly could be configured to deliver an impulse upon actuation of the flow of particles by the blast switch at the blast nozzle which actuates the system, and to deliver an impulse upon release of the blast switch (i.e., upon stopping the particle flow). Additionally, the periodic reciprocation or cycling of impulse assembly 30 could be combined with the blast switch on/off cycling. For example, upon activation so the blast switch, a periodic timer could be started. Upon each passage of a predetermined period of time, impulse assembly 30 would deliver an impulse while the system remained activated. Upon release of the blast switch, an impulse would still be delivered. The periodic timer would start at zero the next time the system was activated by the blast switch. In the example of 1 Hz, an impulse would be delivered upon pressing the blast switch, and for every minute of continuous operation, the periodic timer would cause impulse assembly to deliver an impulse, with a final (for that session of continuous operation) impulse being delivered upon release of the blast switch.

Figure 10:
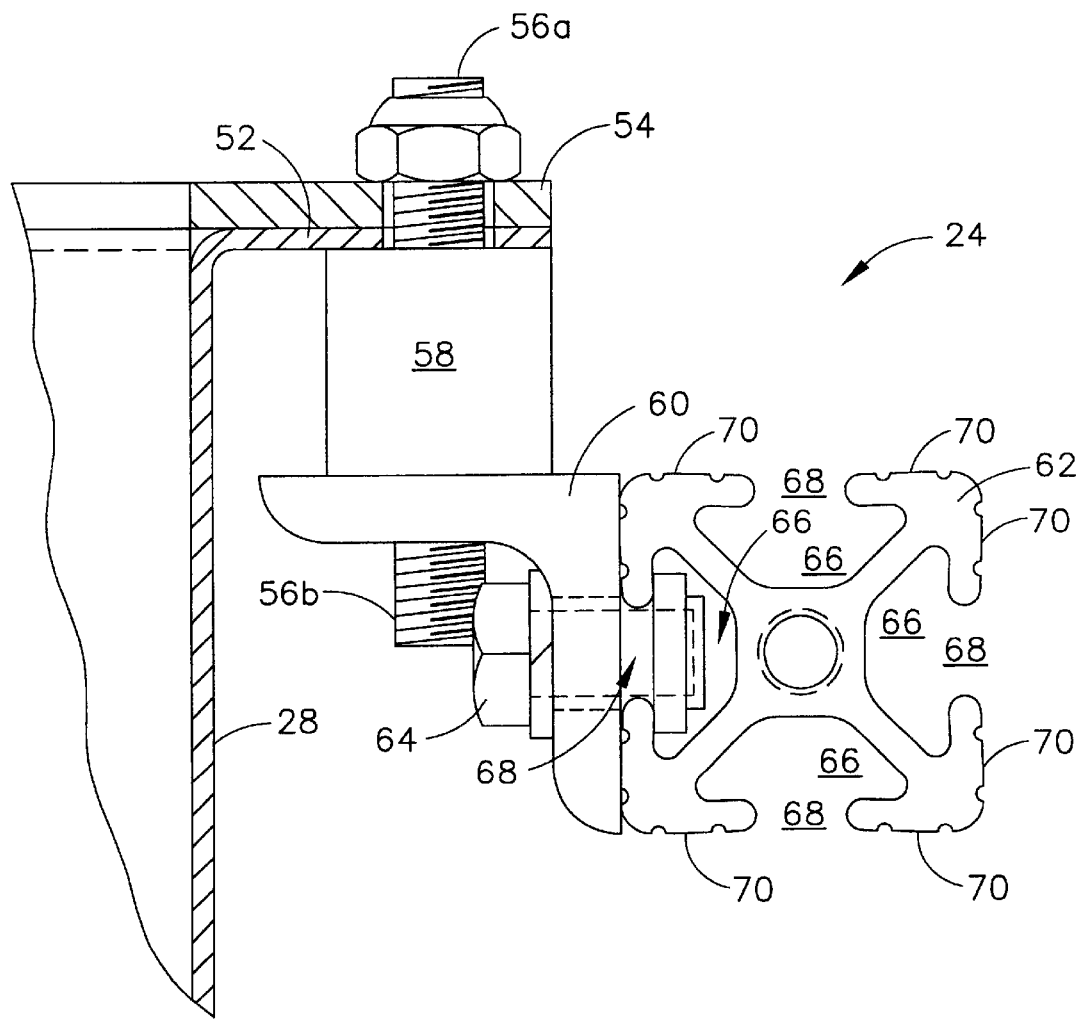
FIG. 10 is an enlarged, fragmentary end view of the hopper slide assembly.

Hopper assembly 12 is slidably carried by housing 16 through hopper slide assembly 24. Referring to FIG. 10, and as can be seen in FIGS. 1–6, the upper edge of hopper 28 is formed as flange 52. Complementarily shaped stiffening flange 54, which provides a rigid base to mount hopper 28 to isolators 58, is disposed overlying flange 52, being secured thereto by a plurality of threaded fasteners 56 extending from the top side of respective isolators 58. Extending from the bottom side of isolators 58 are respective dowels 56*b*, depicted as threaded rods, which extend into openings (not shown) of hopper supports 60. As shown in this embodiment, hopper supports 60 are angle members which extend along opposite edges (see FIG. 6) of hopper 28, with an isolator 58 located at the respective ends thereof. Each hopper support 60 is secured to a respective slide bar 62 by any appropriate fastener 64 at two locations, each location being adjacent or generally aligned with a respective isolator 58.

Although any suitable shape may be used, in the embodiment depicted each slide bar 62 has a generally x cross section, forming four dove tail shaped channels 66, each having a respective channel opening 68. Each slide bar 62 has four generally flat exterior surfaces 70 with channel openings 68 disposed generally along the longitudinal middle thereof. As can be seen in FIGS. 5 and 6, crossbar 72 extends between ends of spaced apart slide bars 62, being secured thereto. Crossbar 72 serves to prevent racking and binding of hopper slide assembly 24 and serves as a handle to pull hopper assembly 12 out as shown in FIG. 3. Access door 22 closes against crossbar 72 to help retain hopper assembly 12 in place.

Figure 11:
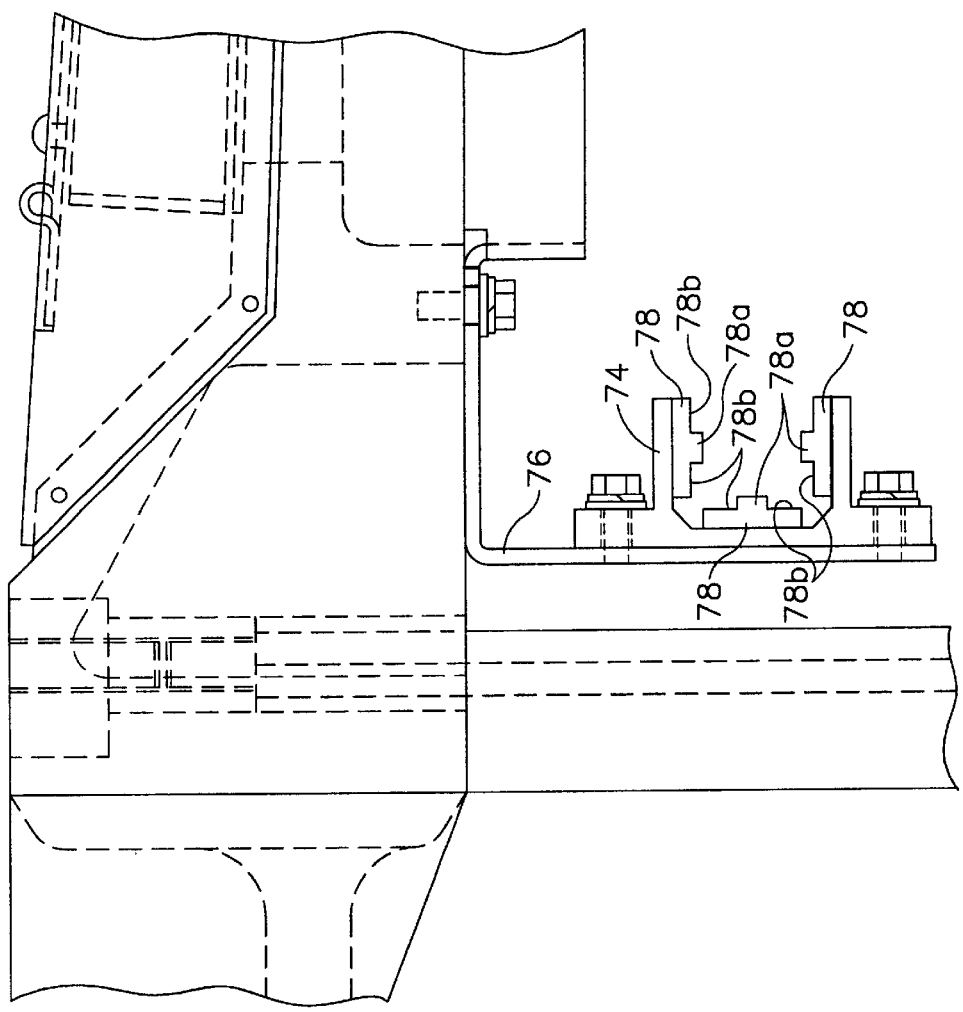
FIG. 11 is an enlarged, fragmentary end view of the linear bearing that receives the hopper slide assembly.

Referring to FIG. 11, the corresponding slide frames 74 of hopper slide assembly 24 is shown having a shape complementary to slide bars 62. As can be seen in FIGS. 2 and 4, there are two spaced apart slide frames 74 for each slide bar 62, located on opposite sides of housing 16. Slide frames 74 are secured to the interior of housing 16 through brackets 76. Each slide frame carries three identical bearings 78, each having an extension 78*a* and surfaces 78*b* on either side thereof. Bearings 78 are made from UHMW-PE. Each extension 78*a* extends into, engaging a respective channel opening 68 and each surface 78*b* engages a respective exterior surface 70. In this manner, slide bars 62 are slidably carried by slide frames 74. As will be appreciated, hopper slide assembly 24 is not limited to the configuration depicted, and any may comprise any configuration of sliding components.

Although a slide assembly is depicted as allowing hopper assembly 24 to be moveable from a first position to a second position by a sliding action, it is but one embodiment by which to achieve a moveable hopper in accordance with the teachings of the present invention. For example, hopper 28 may be pivoted or moved by translational motion, such as by a parallel rotating framework, between a position aligned with the inlet of a feeder assembly and a position not aligned with the inlet of a feeder assembly. This functionality allows the omission of a divert chute for emptying the hopper.

Referring to FIG. 10, it can be seen that dowels 56*b* are not retained to hopper supports 60. Since slide bars 62 are limited to horizontal movement, the weight of hopper assembly 12 maintains hopper assembly 12 in place. In the depicted embodiment, the weight of hopper assembly 12, about 20 pounds empty, 70 pounds full, puts a compressive load on isolators 58. Isolators 58 have a static load rating of 35 pounds and a spring constant of 325 pounds/inch. By applying the static load vertically to isolators 58, most of the impulse energy can be applied in a horizontal direction, achieving a greater range of hopper excursion for the energy delivered during each cycle of impulse assembly 30. Also, putting isolators 58 in compression minimizes vertical movement of hopper assembly 12 without significantly hindering horizontal motion. This allows isolators 58 having a very soft durometer to be used to locate hopper 28 accurately in the vertical plane while allowing hopper 28 to move easily in the horizontal plane, maximizing the efficiency of the energy imparted to hopper 28. Such isolation of hopper assembly 12 keeps substantially all or most of the energy imparted to hopper assembly 12 from being transferred from hopper assembly 12 to the entire apparatus 2, such as through the frame or housing 16, causing substantially all or most of the energy to delivered to the particles within hopper 28, where it is desired so as to maintain the flow of particles toward hopper exit 26.

Although hopper supports 60 are illustrated as being supported by the frame or housing 16 of blast system 2 through slide assembly 24, which allows hopper 28 to be slidably moveable, hopper supports 60 could be secured directly to the frame or housing 16, or even to any other components of particle feeder 2, such as directly to feeder assembly 14.

As used herein, hopper support includes any structure which provides the support for hopper assembly 12 and therefore hopper 28, regardless of how the hopper supports are supported themselves. As used herein, a hopper support which is supported directly by the frame or housing of particle feeder 2 or by a component of particle feeder 2 is considered as being carried by, mounted to or supported by particle feeder 2. The hopper supports are considered to carry or support hopper assembly 12 and therefore hopper 28 by isolators 58 which mechanically isolate hopper 28/hopper assembly 12 from hopper supports 60 and thereby from the rest of particle feeder 2 meaning that there is not a rigid connection between hopper 28 and the rest of particle feeder 2 which transmits or conducts from hopper 28 to the rest of particle feeder 2 a significant portion of mechanical energy imparted to hopper 28.

Figure 12:
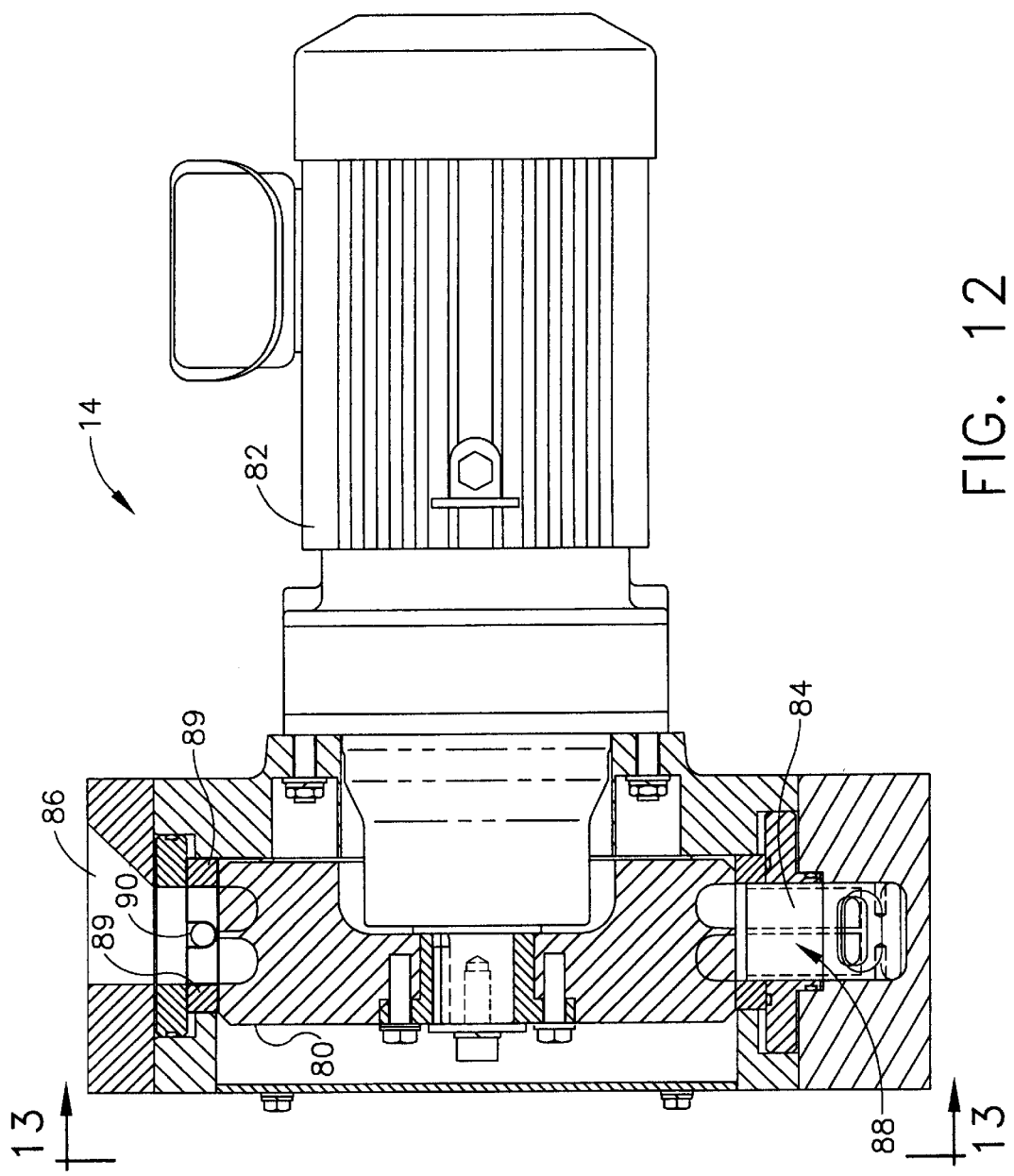
FIG. 12 is a side view of the particle feeder assembly shown in partial cross section.

Referring now to FIG. 12, feeder assembly 14 includes rotor 80 driven by motor 82. Rotor 80 includes a plurality of circumferentially spaced apart particle transport cavities 84 which carry particles circumferentially from receiving station 86 to discharge station 88. Seal 89, made of a UHMW material, is disposed sealingly against rotor 80. It is noted that any feeder configuration may be used with any aspects of the present invention.

Figure 13:
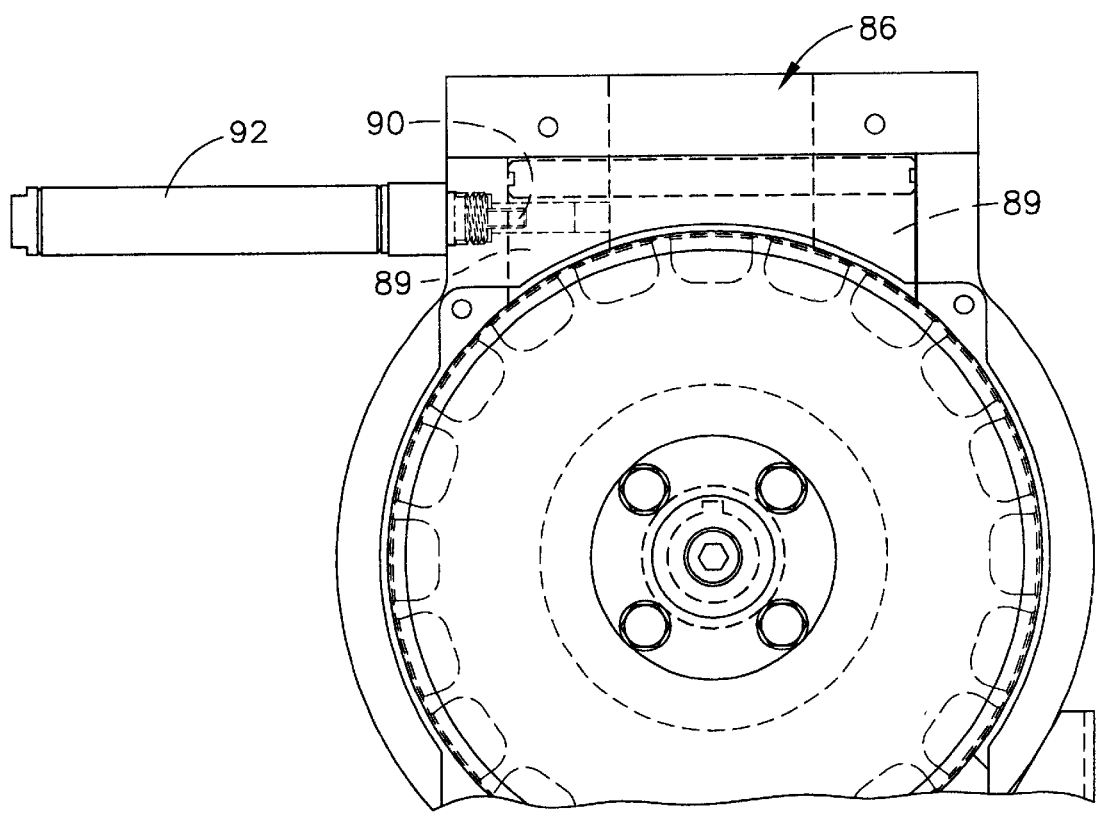
FIG. 13 is a fragmentary end view of the particle feeder assembly of FIG. 12, looking along arrow 12 of FIG. 12.

Referring also to FIG. 13, located adjacent receiving station 86 and concomitantly adjacent exit 26 of hopper 28 (not shown in FIG. 12 or 13), is extendable member, or ramrod 90, configured to be selectively extended into the particle flow, mechanically breaking up clumps of particles. Extendable member 90 is moveable between a first, retracted position (see FIG. 15) and a second, extended position (see FIG. 14). Extendable member 90 is actuated by actuator 92, which in the embodiment depicted is a pneumatic cylinder having a ¾ inch×3 inch stroke. As best seen in FIG. 12, extendable member 90 is disposed just above rotor 80, aligned with the rotor's center. Extendable member 90 may be disposed further from rotor 80, but should not be so high that it is ineffective. Extendable member 90 is located to strike, upon extension, any clumps of particles that are near receiving station 86 which are large enough to block the flow or which are too large to enter transport cavities 84. When extended, extendable member 90 preferably, but not necessarily, contacts the opposed side of seal 89.

The extension of extendable member 90 may be controlled extended in a variety of ways. Preferably, when the blast trigger located at the discharge nozzle (not shown) of blast system 2 is initially depressed, causing pellets to flow out the discharge nozzle, extendable member 90 is extended and retracted once. During operation, if the operator notices an interruption or decrease in the flow of particles, the operator may release and depress the blast trigger to cause extendable member 90 to cycle. Various alternative control systems are possible. For example, the system could be configured to cycle extendable member 90 two or more times upon depressing the blast trigger; to cycle one or more times automatically upon detection of a blockage or lack of/reduced flow; to cycle at regular intervals or at intervals based on operating system parameters; with an additional actuation switch at the blast nozzle separate from the blast trigger.

Figure 14:
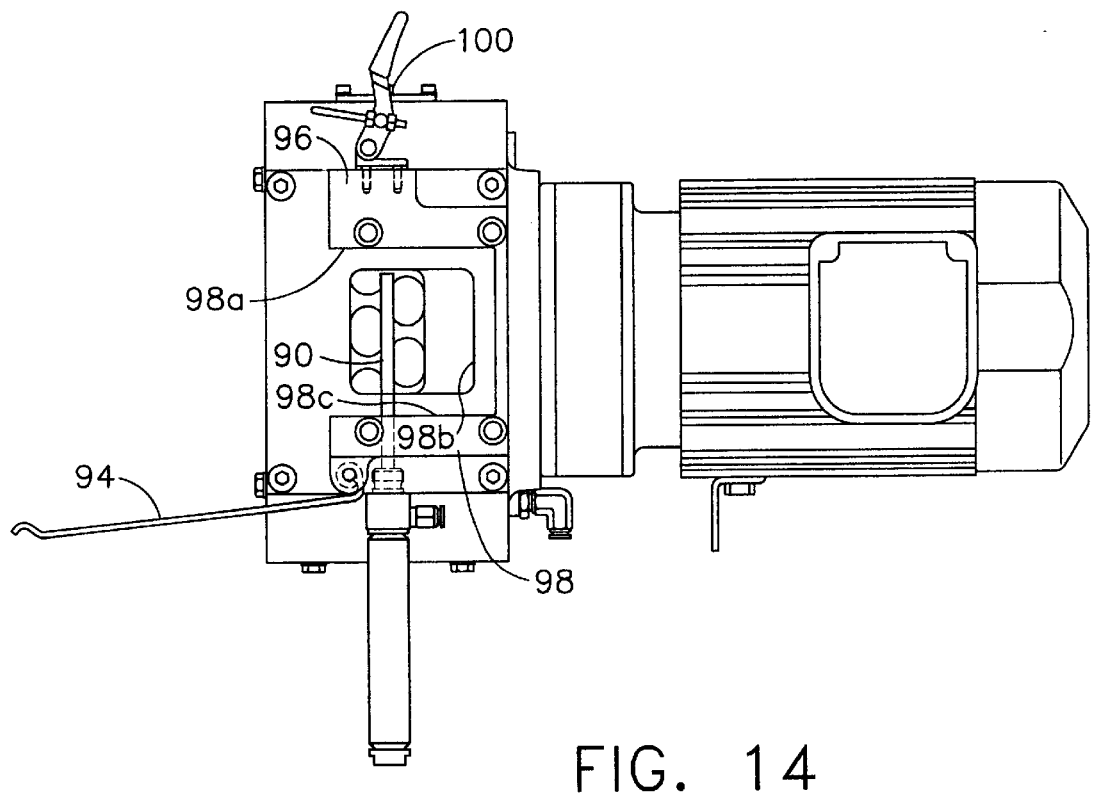
FIG. 14 is a top view of the particle feeder assembly of FIG. 12, showing the feeder throat.
Figure 15:
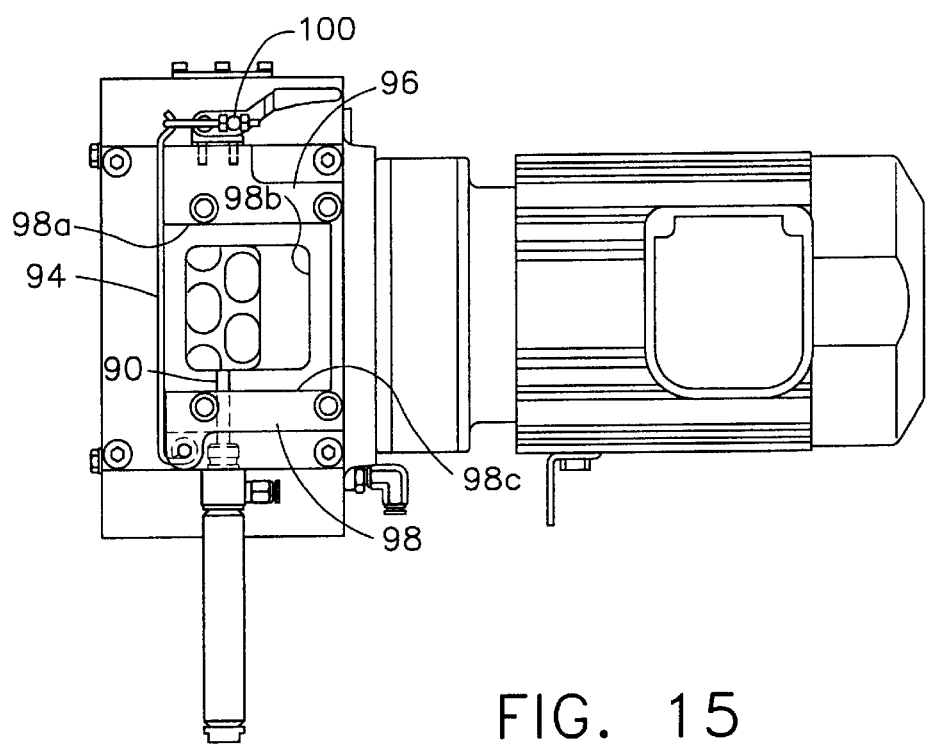
FIG. 15 is a top view of the particle feeder assembly of FIG. 12, showing the pivoting gate or latch open and the extendable member extended into the feeder throat.

Referring also to FIGS. 14 and 15, extendable member 90 is shown in the extended and retracted positions, respectively. In the embodiment depicted, reciprocable member 90 is extendable transversely into the path of particles. However, various orientations of extendable member 90 may be used, so long as the function of breaking up agglomerated clumps of particles is met. Multiple extendable members may be used, extending in the same, opposite or perpendicular directions. Extendable member may be located perpendicular to the particle flow, as shown, or at another angle as may be selected to effect the extension into the particle path to impact clumps.

FIGS. 14 and 15 also illustrate the quick release sealed connection between hopper exit 26 and feeder assembly 14, with pivoting clamp 94 is shown in the open and closed positions, respectively. Clamping assembly 96 is secured to feeder assembly 14 adjacent receiving station 86, forming a seal therewith. Clamping assembly 96 includes frame 98, having three sides 98*a*, 98*b* and 98*c*, defining an opening which overlies receiving station 86 which is shaped complementarily with hopper exit 26. Clamp 94 comprises the fourth, movable side of clamping assembly 96.

Referring also to FIGS. 2 and 3, the open side of frame 98 is oriented to the right in the figures, allowing hopper assembly 12 to be slid between the positions shown in FIGS. 2 and 3. Seal 36 is disposed about hopper exit 26 as can be seen in FIG. 4. When hopper is in the operational position, three sides of seal 36 sealingly engage sides 98*a*, 98*b* and 98*c*. Clamp 94 is secured in place to form the fourth side by over center latch 100, as shown in FIG. 15. Seal 36 thus sealingly engages clamp 94, forming a complete seal between hopper 28 and feeder assembly 14 adjacent receiving station 86. When hopper 28 is slide out of its operational position, clamp 94 is opened by undoing over center clamp 100, opening the fourth side so that hopper exit 26 and seal 38 are free to move.

Seal 36 is flexible enough to isolate hopper 28 from feeder assembly 14 and accommodate imprecise alignment therebetween, yet maintain the necessary seal to prevent humid air and moisture from contacting the cryogenic particles in the hopper. In the depicted embodiment, seal 36 was a 40 durometer silicon rubber available Parker JBL of Toledo, Ohio, under number S7442.

Figure 16:
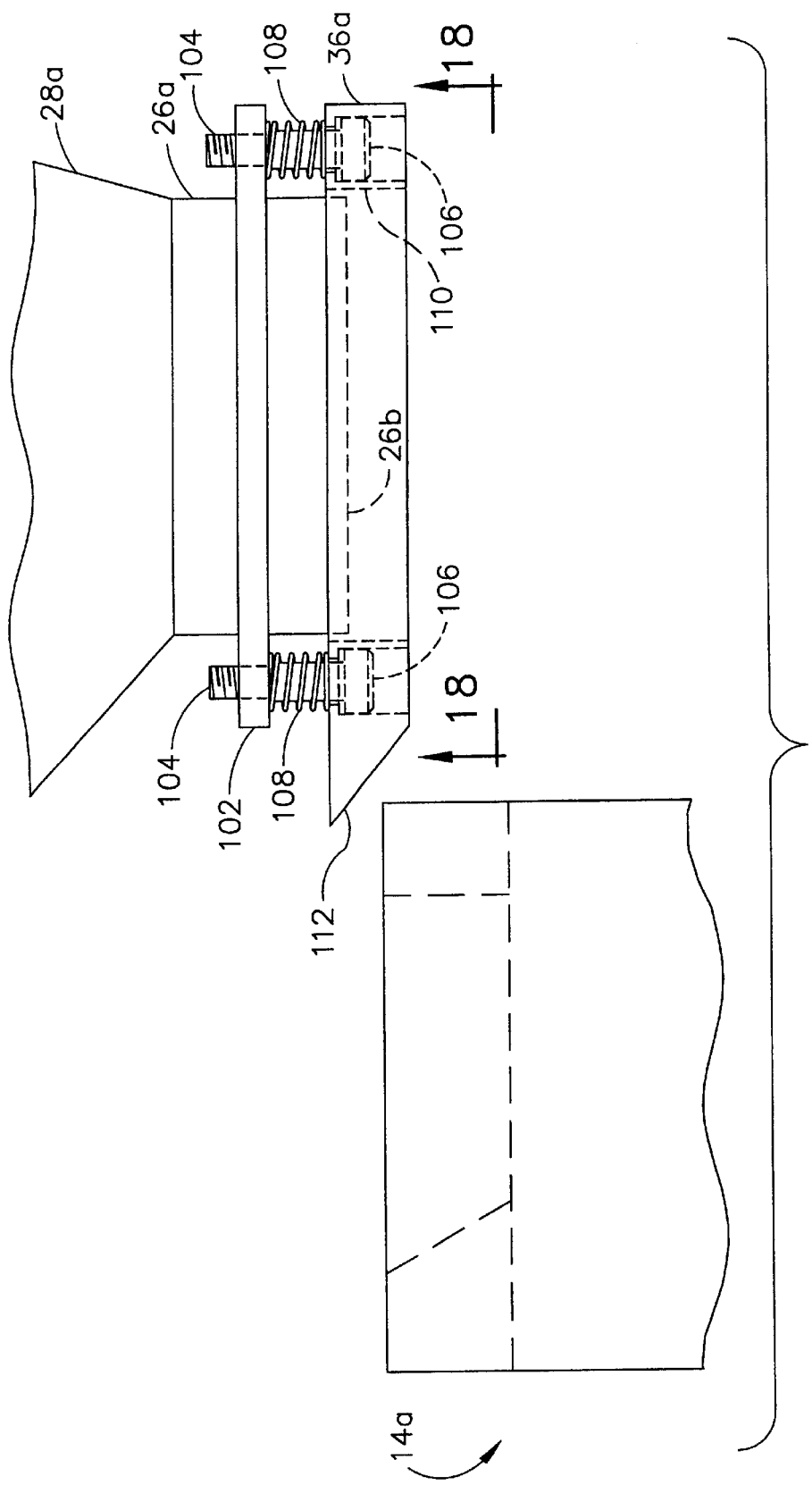
FIG. 16 is a side view of an alternate embodiment of the seal between the hopper and the feeder assembly with the hopper in the extended position.
Figure 17:
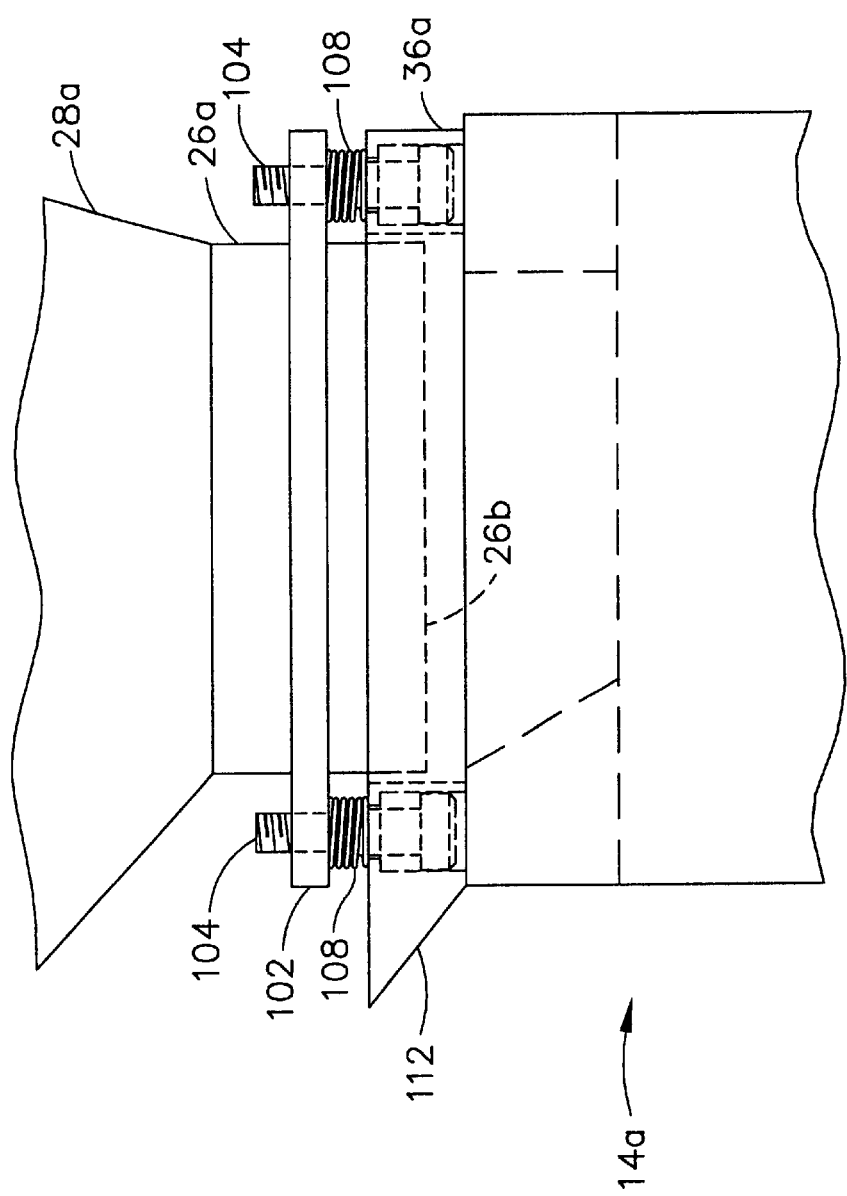
FIG. 17 is a side view of the alternate embodiment of FIG. 16 with the hopper exit aligned with the feeder assembly.

FIGS. 16 and 17 illustrate an alternate embodiment of the seal between the hopper and the feeder assembly. In this embodiment, clamp 94, clamping assembly 96, three sided frame 98 and over center latch 100 are not required. Referring to FIG. 16, hopper 28*a* is shown in the extended position at which exit 26*a* is not aligned with feeder assembly 14*a*. Hopper 28*a* includes flange 102 extending outwardly from exit 26*a* as illustrated. Seal 36*a* is connected to flange 102 by a plurality of fasteners 104. Fasteners 104 are threaded into holes formed in flange 102, and pass through holes formed in seal 36*a* which are sized to allow seal 36*a* to move axially along fasteners 36*a*. Ends 106 of fasteners 104 are configured to retain seal 36*a* to fasteners 104. Respective resilient members, such as springs 108, and disposed about each fastener 104 to resiliently urge seal 36*a* away from flange 102.

Seal 36*a* includes an opening 110 formed therethrough which is shaped complementarily to exit 26*a*. As can be seen, at the position of seal 36a shown in FIG. 16, bottom surface 26b of exit 26a extends into opening 110. Preferably, although not necessarily, this vertical overlap is at least 1/16 inch. Seal includes an inclined surface 112, or ramp, at the end of seal 36a closest to feeder assembly 14a.

Referring to FIG. 17, exit 26a is aligned with feeder assembly 14a. To reach this position, as hopper 28a was moved to the left (relative to FIGS. 16 and 17), inclined surface 112 engaged feeder assembly 14a, causing seal 36a to be vertically displaced and move along fasteners 104, compressing springs 108. The angle of inclined surface 112 may be any angle which will result in such movement. In one embodiment, this angle was approximately 25 degrees. Although FIG. 17 illustrates springs 108 as being fully compressed, it will be understood that springs 108 are not necessarily fully compressed.

Seal 36a is made of any suitable material, such as UHMW, Nylon, Teflon, or any other plastic of similar or adequate temperature and wear characteristics. At the position of FIG. 17, the seal 36a is urged toward the top surface of feeder assembly 14a with a force sufficient to form a seal therebetween. In one embodiment, the sealing force therebetween was approximately 5 pounds.

As illustrated in FIG. 17, there is clearance between bottom surface 26b and the upper surface of feeder assembly 14a. The vertical distance (or overlap) measured between the upper surface of seal 36a and the bottom surface 26b is any distance sufficient to allow adequate sealing between seal 36a and exit 26a, as described below. In one embodiment, the overlap is at least approximately 1/8 inch.

Figure 18:
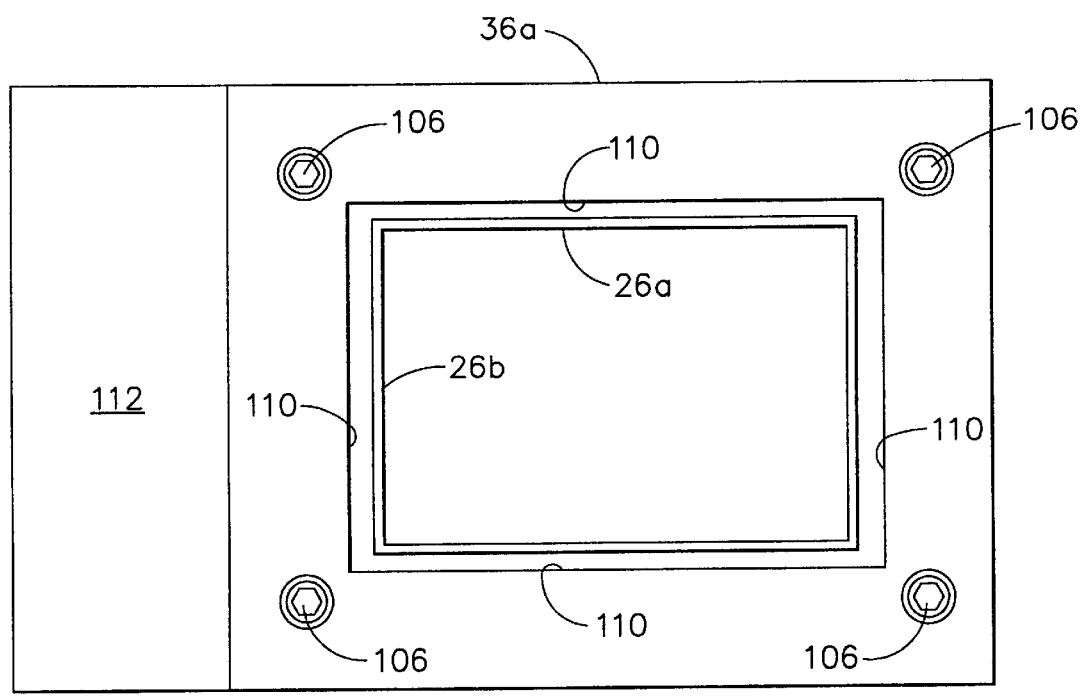
FIG. 18 is a view of the alternate embodiment of the seal, taken along arrow 18 of FIG. 16.

Referring to FIG. 18, there is clearance between the outside of exit 26a and opening 110. During operation, due to the cold temperatures, ice forms between exit 26a and opening 110, forming a seal therebetween. In accordance with one embodiment, the clearance between the outside of exit 26a and opening 110 is a maximum of 3/32 inches and a minimum of 1/16 inches. In any event, the clearance must be small enough to facilitate the formation of such an ice seal, yet not too small so as to interfere with the desired movement of seal 36a about exit 26a.

Figure 19:
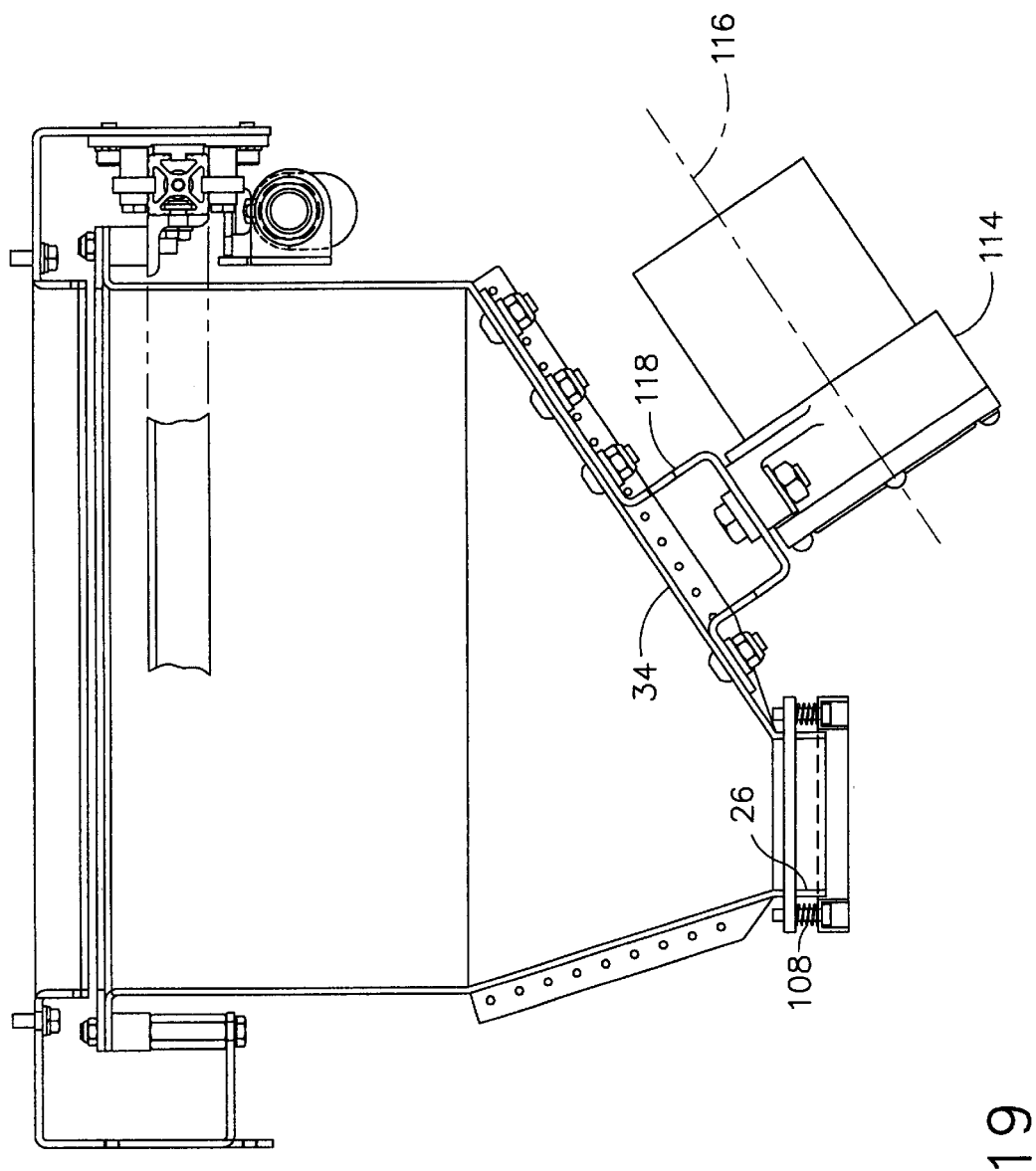
FIG. 19 is a side view of an alternate embodiment of the hopper illustrating a vibrator.

Referring to FIG. 19, there is shown vibrator 114 which has an axis of rotation 116, oriented generally parallel to inclined bottom wall section 34. Preferably axis 116 is as vertical, relative to exit 26, as possible. Vibrator 114 is connected directly to inclined bottom wall section 34 through bracket 118. The size of vibrator is dictated by the size of the hopper, selected to impart energy into the hopper in conjunction with impulse assembly 30. For example, continuous speed and variable speed operation of vibrator 114 at up to 3200 vibrations per minute produce desirable results in combination with impulse assembly 30 to minimize bridging and other deleterious particle phenomenon In summary, numerous benefits have been described which result from employing the concepts of the invention. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A particle blast apparatus, comprising:
   (a) at least one hopper support carried by said particle blast apparatus and
   (b) a hopper for receiving particles, said hopper being carried by and mechanically isolated from said at least one hopper support.

2. The particle blast apparatus of claim 1, including at least one mechanical isolator disposed between said hopper and said at least one hopper support.

3. The particle blast apparatus of claim 2, wherein said at least one mechanical isolator is under compression.

4. The particle blast apparatus of claim 1, wherein said hopper includes an exit, and said particle feeder include a feeder, said feeder having an inlet for receiving said particles, said hopper being moveable from a first position at which said exit is generally aligned with said inlet to a second position at which said exit is not aligned with said inlet.

5. The particle blast apparatus of claim 4, further comprising a slide assembly, said at least one hopper support being connected to said slide assembly.

6. The particle blast apparatus of claim 1, comprising an impulse assembly configured to deliver energy to said hopper.

7. The particle blast apparatus of claim 6, wherein said impulse assembly is carried by said hopper.

8. The particle blast apparatus of claim 6, wherein said impulse assembly comprises at least one member, which is reciprocated between first and second positions.

9. The particle blast apparatus of any of claims 1–8 wherein said particles are cryogenic particles.

* * * * *